US012084593B2

(12) United States Patent
Betzig et al.

(10) Patent No.: US 12,084,593 B2
(45) Date of Patent: Sep. 10, 2024

(54) SPRAYABLE SILICONE POLYMER DISPERSION

(71) Applicant: PPG Industries Ohio, Inc., Cleveland, OH (US)

(72) Inventors: Dikran Betzig, Bolton, MA (US); Adam James Kolcun, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 539 days.

(21) Appl. No.: 17/416,826

(22) PCT Filed: Dec. 16, 2019

(86) PCT No.: PCT/IB2019/060824
§ 371 (c)(1),
(2) Date: Jun. 21, 2021

(87) PCT Pub. No.: WO2020/128773
PCT Pub. Date: Jun. 25, 2020

(65) Prior Publication Data
US 2022/0064457 A1 Mar. 3, 2022

Related U.S. Application Data

(60) Provisional application No. 62/781,640, filed on Dec. 19, 2018.

(51) Int. Cl.
*C09D 5/02* (2006.01)
*C09D 7/20* (2018.01)
*C09D 7/40* (2018.01)
*C09D 7/61* (2018.01)
*C09D 183/04* (2006.01)
*F16L 59/02* (2006.01)

(52) U.S. Cl.
CPC ............... *C09D 5/021* (2013.01); *C09D 7/20* (2018.01); *C09D 7/61* (2018.01); *C09D 7/70* (2018.01); *C09D 183/04* (2013.01); *F16L 59/028* (2013.01)

(58) Field of Classification Search
CPC ... C09D 5/02; C09D 7/20; C09D 7/40; C09D 7/61; C09D 183/04
USPC ........................................................ 523/219
See application file for complete search history.

(56) References Cited

U.S. PATENT DOCUMENTS

| | | | |
|---|---|---|---|
| 2,833,441 A | 5/1958 | Hedlund | |
| 2,833,735 A | 5/1958 | Siegfried et al. | |
| 2,977,349 A | 3/1961 | Brockway et al. | |
| 3,035,071 A | 5/1962 | Haslam | |
| 3,058,936 A | 10/1962 | Rene et al. | |
| 3,072,596 A | 1/1963 | Edward et al. | |
| 3,107,226 A | 10/1963 | Ian et al. | |
| 3,931,084 A | 1/1976 | Buckley et al. | |
| 4,031,059 A | 6/1977 | Strauss | |
| 4,112,179 A | 9/1978 | Maccalous et al. | |
| 4,408,031 A | 10/1983 | Holtschmidt et al. | |
| 4,769,398 A | 9/1988 | Kanda et al. | |
| 5,084,304 A | 1/1992 | Lienert et al. | |
| 5,506,016 A | 4/1996 | Onodera et al. | |
| 5,962,568 A | 10/1999 | Decker et al. | |
| 5,998,560 A | 12/1999 | Decker et al. | |
| 6,011,106 A | 1/2000 | De La Cuesta Sheppard | |
| 6,892,817 B2 | 5/2005 | Janoff | |
| 7,959,981 B2 | 6/2011 | Sadvary et al. | |
| 8,513,328 B2 | 8/2013 | Dorman | |
| 9,517,190 B2 | 12/2016 | Johncock et al. | |
| 2003/0012967 A1 | 1/2003 | Janoff | |
| 2005/0020768 A1 | 1/2005 | Pause | |
| 2006/0068085 A1 | 3/2006 | Reece et al. | |
| 2006/0088657 A1 | 4/2006 | Reece et al. | |
| 2006/0157303 A1 | 7/2006 | Reece et al. | |
| 2006/0249298 A1 | 11/2006 | Reece et al. | |
| 2007/0154696 A1 | 7/2007 | Angenendt | |
| 2009/0061097 A1 | 3/2009 | Sadvary et al. | |
| 2009/0238981 A1 | 9/2009 | Decker et al. | |
| 2010/0076542 A1 | 3/2010 | Orlowski | |
| 2010/0310852 A1 | 12/2010 | Weidinger | |
| 2012/0029136 A1 | 2/2012 | Lindner et al. | |
| 2015/0265510 A1 | 9/2015 | Johncock et al. | |

(Continued)

FOREIGN PATENT DOCUMENTS

AT 12652 T 4/1985
BE 586788 A 3/1961

(Continued)

OTHER PUBLICATIONS

Burgard et al., "Nanotechnology makes green coatings go ahead", Surface Coatings Australia (2011), vol. 48, No. 3, 16-19CODEN: SCAUE6; ISSN: 0815-709X.

Decocq et al., "A new technology for environmentally friendly UV-resistant water-borne anti-corrosion paints", Federation of Societies for Coatings Technology, Proceedings of the Annual Meeting Technical Program of the FSCT (2001), 79th, 363-374CODEN: PAMTCE; ISSN:1536-9463.

Du et al., "Development and application of ultra high build epoxy solventless coatings", Tuliao Gongye (2007), vol. 37, No. 2, 8-9CODEN: TLKYD5; ISSN: 0253-4312.

(Continued)

*Primary Examiner* — Deve V Hall
(74) *Attorney, Agent, or Firm* — Workman Nydegger

(57) ABSTRACT

A sprayable polymer dispersion includes (a) a room temperature vulcanizing (RTV) silicone polymer, (b) a polysiloxane, (c) an insulating agent and (d) an organic carrier in which components (a), (b), and (c) are suspended. Also included in the present invention is a method of producing a corrosion resistant coating on a substrate comprising spraying the polymeric dispersion onto at least a portion of a substrate and moisture curing each of components (a) and (b) to form a monolithic coating on the substrate, as well as a substrate at least partially coated with the sprayable polymer dispersion.

20 Claims, No Drawings

(56) References Cited

U.S. PATENT DOCUMENTS

| | | | |
|---|---|---|---|
| 2016/0122556 | A1 | 5/2016 | Yang et al. |
| 2016/0168397 | A1 | 6/2016 | Liu et al. |
| 2017/0009098 | A1* | 1/2017 | Huda .............. C09D 5/00 |

FOREIGN PATENT DOCUMENTS

| | | |
|---|---|---|
| BE | 638671 | 2/1964 |
| BR | PI8601726 A | 12/1986 |
| BR | 8807810 A | 10/1990 |
| BR | 102015005868 A2 | 3/2016 |
| CA | 1017887 A | 9/1977 |
| CA | 2262294 A1 | 9/1999 |
| CN | 1899702 A | 1/2007 |
| CN | 100486717 C | 5/2009 |
| CN | 101542182 A | 9/2009 |
| CN | 101544881 A | 9/2009 |
| CN | 101821018 A | 9/2010 |
| CN | 101831264 A | 9/2010 |
| CN | 102108250 A | 6/2011 |
| CN | 102344569 A | 2/2012 |
| CN | 102382314 A | 3/2012 |
| CN | 102504293 A | 6/2012 |
| CN | 102627937 A | 8/2012 |
| CN | 102719216 A | 10/2012 |
| CN | 103289637 A | 9/2013 |
| CN | 103666146 A | 3/2014 |
| CN | 103881648 A | 6/2014 |
| CN | 103897410 A | 7/2014 |
| CN | 103937442 A | 7/2014 |
| CN | 104371527 A | 2/2015 |
| CN | 104387958 A | 3/2015 |
| CN | 104449547 A | 3/2015 |
| CN | 104867541 A | 8/2015 |
| CN | 104921965 A | 9/2015 |
| CN | 105038689 A | 11/2015 |
| CN | 105153933 A | 12/2015 |
| CN | 105273667 A | 1/2016 |
| CN | 105378010 A | 3/2016 |
| CN | 105419535 A | 3/2016 |
| CN | 105623543 A | 6/2016 |
| CN | 105694694 A | 6/2016 |
| CN | 105713542 A | 6/2016 |
| CN | 106010426 A | 10/2016 |
| CN | 106221661 A | 12/2016 |
| CN | 106280993 A | 1/2017 |
| CN | 106281186 A | 1/2017 |
| CN | 106590335 A | 4/2017 |
| CN | 106634763 A | 5/2017 |
| CN | 106634805 A | 5/2017 |
| CN | 107353814 A | 11/2017 |
| CN | 107353871 A | 11/2017 |
| DE | 1038679 B | 9/1958 |
| DE | 1172229 B | 6/1964 |
| DE | 1178819 B | 10/1964 |
| DE | 1201294 B | 9/1965 |
| DE | 1215642 B | 5/1966 |
| DE | 2329721 A1 | 12/1973 |
| DE | 3103932 A1 | 8/1982 |
| DE | 3739612 A1 | 6/1989 |
| DE | 102007008479 A1 | 9/2008 |
| EP | 0058299 A1 | 8/1982 |
| EP | 0200433 A2 | 11/1986 |
| EP | 0317795 A1 | 5/1989 |
| EP | 0391961 A1 | 10/1990 |
| EP | 0950695 A1 | 10/1999 |
| EP | 1983034 A2 | 10/2008 |
| EP | 2125062 A2 | 12/2009 |
| EP | 2254956 A2 | 12/2010 |
| EP | 2921157 A1 | 9/2015 |
| EP | 3022267 A1 | 5/2016 |
| ES | 0554018 | 12/1987 |
| ES | 2643590 T3 | 11/2017 |
| FR | 2187868 A1 | 1/1974 |
| GB | 0804162 A | 11/1958 |
| GB | 0911000 A | 11/1962 |
| GB | 966306 A | 8/1964 |
| GB | 1091722 A | 11/1967 |
| GB | 1439599 A | 6/1976 |
| IN | 104448329 A | 3/2015 |
| IT | 988248 B | 4/1975 |
| JP | 49-057032 A | 6/1974 |
| JP | 61-209268 A | 9/1986 |
| JP | 61-209269 A | 9/1986 |
| JP | 62-030164 A | 2/1987 |
| JP | 63-035180 B2 | 7/1988 |
| JP | 63-035181 B2 | 7/1988 |
| JP | 01-011169 Y2 | 3/1989 |
| JP | 03-115369 A | 5/1991 |
| JP | 04-139281 A | 5/1992 |
| JP | 04-173867 A | 6/1992 |
| JP | 04-065108 B2 | 10/1992 |
| JP | 05-255638 A | 10/1993 |
| JP | 07-334088 A | 12/1995 |
| JP | 2504061 B2 | 6/1996 |
| JP | 2614022 B2 | 5/1997 |
| JP | 09-188849 A | 7/1997 |
| JP | 2005-342577 A | 12/2005 |
| JP | 3760214 B2 | 3/2006 |
| JP | 2007-014895 A | 1/2007 |
| JP | 4057557 B2 | 3/2008 |
| JP | 2008-075026 A | 4/2008 |
| JP | 2008-120067 A | 5/2008 |
| JP | 4094016 B2 | 6/2008 |
| JP | 2008-260876 A | 10/2008 |
| JP | 4653145 B2 | 3/2011 |
| JP | 2012-531379 A | 12/2012 |
| JP | 2013107995 A | 6/2013 |
| JP | 2015-178437 A | 10/2015 |
| JP | 2016-047879 A | 4/2016 |
| JP | 2016-528334 A | 9/2016 |
| JP | 2016-210879 A | 12/2016 |
| JP | 201844039 A | 3/2018 |
| KR | 0175287 B1 | 3/1999 |
| KR | 10-2015-0108796 A | 9/2015 |
| MY | 159591 A | 1/2017 |
| NL | 6506909 A | 12/1965 |
| NL | 7307944 A | 12/1973 |
| NO | 175822 B | 9/1994 |
| RU | 2453379 C2 | 6/2012 |
| WO | 89/04857 A1 | 6/1989 |
| WO | 2006/118702 A2 | 11/2006 |
| WO | 2008/096262 A1 | 8/2008 |
| WO | 2008/101486 A2 | 8/2008 |
| WO | 2009/029635 A2 | 3/2009 |
| WO | 2009/117334 A2 | 9/2009 |
| WO | 2015/006937 A1 | 1/2015 |
| WO | 2015/139782 A1 | 9/2015 |
| WO | 2015/158257 A1 | 10/2015 |

OTHER PUBLICATIONS

Kamble et al., "Surface tolerant coatings", Paintindia (2015), vol. 65, No. 2, 66-68, 70CODEN: PANTAH; ISSN: 0556-4409.

O'Donoghue et al., "Electrochemical impedance spectroscopy: Testing coatings for rapid immersion service", Materials Performance; Sep. 2003; vol. 42, No. 9, pp. 36-41.

Office Action received for Japanese Patent Application No. 2021-535647, mailed on Jan. 20, 2023, 10 pages (6 pages of English Translation and 4 pages of Original Document).

Ru et al., "Development of new type of high-build rapid cure epoxy coating", XiandaiTuliao Yu Tuzhuang (2014), vol. 17, No. 6, 10-12, 38CODEN: XTYTAL; ISSN: 1007-9548.

Viertel et al., "Project RepaKorr: Development of a novel single coat, direct to metal repair coating with outstanding protection and colour retention performance for offshore structures", Materials and Corrosion, vol. 68, Issue 12, Dec. 2017, pp. 1321-1325.

Office Action received for Chinese Patent Application No. 201980084048.6, mailed on Jun. 26, 2023, 12 pages (6 pages of English Translation and 6 pages of Original Document).

International Preliminary Report on Patentability received for PCT Patent Application No. PCT/IB2019/060824, mailed on Jul. 1, 2021, 8 pages.

(56) References Cited

OTHER PUBLICATIONS

International Search Report and Written Opinion received for PCT Patent Application No. PCT/IB2019/060824, mailed on Mar. 20, 2022, 11 pages.

Office Action received for Chinese Patent Application No. 201980084048.6, mailed on Jul. 18, 2022, 16 pages (8 pages of English Translation and 8 pages of Original Document).

Office Action received for Japanese Patent Application No. 2021-535647, mailed on Jun. 20, 2022, 8 pages (5 pages of English Translation and 3 pages of Original Document).

* cited by examiner

SPRAYABLE SILICONE POLYMER DISPERSION

FIELD OF THE INVENTION

The present invention relates to sprayable polymer dispersions, coatings formed therefrom, and methods of forming such coatings.

BACKGROUND OF THE INVENTION

Sprayable coatings used to insulate components such as metallic pipes or the like typically use sprayable aqueous acrylic emulsions or epoxy binders. Most of these must be applied in multiple coats to achieve a desired film thickness and require a primer for corrosion control and a sealer coat for moisture permeability and UV protection. Under thermal load, these systems will degrade in 5-7 years when exposed to temperatures above 300°F (150° C.).

SUMMARY OF THE INVENTION

The present invention comprises a sprayable polymer dispersion comprising (a) a room temperature vulcanizing (RTV) silicone polymer, (b) an alkoxy polysiloxane, (c) an insulating agent, and (d) an organic carrier in which components (a), (b), and (c) are suspended. Also included in the present invention is a method of producing a coating on a substrate comprising spraying the polymer dispersion onto at least a portion of a substrate and curing each of components (a) and (b) to form a monolithic coating on the substrate, as well as a substrate at least partially coated with the sprayable polymer dispersion

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, and the like refer to one or more of any of these items.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The sprayable polymer dispersion of the present invention includes (a) a room temperature vulcanizing (RTV) silicone polymer, (b) an alkoxy polysiloxane, (c) an insulating agent and (d) an organic carrier in which components (a), (b), and (c) are suspended. The sprayable dispersion of the present invention may be applied to a substrate in a suitable film thickness (e.g. 100 mils or 500 mils) in a single coat which provides adequate corrosion protection and thermal insulation without the need for additional coatings. By "sprayable", it is meant that the composition can be applied to a substrate using conventional spray equipment for coating compositions.

RTV Silicone Polymer

By RTV silicone polymer, it is meant a curable polysiloxane that is curable at room temperature (e.g. 20-25° C.), and may be cured in the presence of moisture and/or a catalyst. Suitable polysiloxanes have the formula (I):

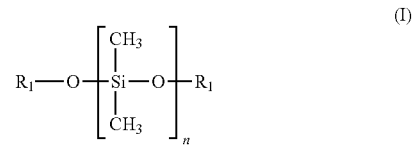

where each R is independently an acetoxy, alkoxy, oxime or amine group, and where n is selected so that the molecular weight (Mw) for the polysiloxane is 10,000 to 100,000 (all Mw disclosed herein being determined by gel permeation chromatography using a polystyrene standard for calibration), such as are commercially available, such as ELASTOSIL E951 and ELASTOSIL M4444 (Wacker Chemical Corporation, Adrian, MI). Other suitable RTV silicone polymers have branched or networked structures, as are well known in the art, and may include reactive groups such as hydroxyl groups or hydrolysable groups. By moisture curable or moisture curing, it is meant that the polysiloxane is further polymerized and/or crosslinked, typically using water that is available in the surrounding atmosphere (i.e. as moisture) and present within the curable coating composition. For RTV silicone polymers having hydrolyzable groups, such as alkoxy group, water hydrolyzes the groups on the polysiloxane, resulting in free hydroxyl groups. Water hydrolyzes alkoxy groups on the polysiloxane, resulting in free hydroxyl groups. In a subsequent condensation reaction between the free hydroxyl groups, the polysiloxane is considered to be cured. This reaction mechanism may be described as a hydrolysis-condensation mechanism, with the reactions typically catalyzed with an alkyl titanate (hydrolysis reaction) and a strong base (condensation reaction).

The RTV silicone polymer can comprise a single component or a combination of two or more components. For example, the RTV silicone polymer may be produced from a two-part polymer system comprising a binder portion, e.g. comprising a polysiloxane with vinyl groups, and a cross-linking portion, e.g. comprising a polysiloxane with hydride groups. Upon mixing the two parts in the presence of a catalyst (e.g. a platinum catalyst, which may be provided with one of the two portions) the binder portion and cross-linking portion polymerize at the vinyl groups.

Polysiloxane

The polysiloxane (b), which is different from the RTV silicone polymer (a), or sometimes referred to herein as "silicone intermediate" used in the present invention include polysiloxanes having the general formula (II):

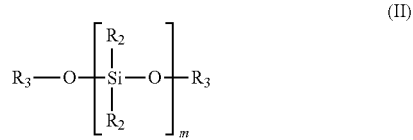

where each $R_2$ group may be an alkyl group having up to six carbon atoms and where m is selected so the Mw of the alkoxy polysiloxane is up to 8,000. Each $R_3$ group may be an alkoxy, urethane, acylate, or epoxide group having up to two carbon atoms. The polysiloxane (b) may be substantially free of or completely free of (none) aryl groups, such as phenyl groups. Aryl groups are believed to block movement of moisture through the coating composition during curing, thereby interfering with the moisture curing process of a moisture curable polysiloxane. By substantially free of aryl groups, it is mean that any such groups present do not impact the moisture permeability during curing of the coating compositions. Suitable alkoxy polysiloxanes are commercially available such as DOWSIL 2405 (Dow Chemical Company, Midland, MI).

Insulating Agent

The dispersions of the present invention include an insulating agent. By insulating agent, it is meant a component that enhances the thermal insulating property of the resulting coating applied to a substrate. For example, the coating produced according to the present invention when applied to a heated metal substrate, such as a metal pipe through which fluid flows at elevated temperature, that otherwise would be uncomfortable or dangerous to touch with a bare hand, provides insulation from the heated metal substrate. Suitable insulating agents include microspheres, such as hollow microspheres produced from glass, borosilicate, or aluminum silicate. Hollow microspheres typically provide additional insulation by virtue of the air or gas filled interiors thereof. Certain insulating agents (for example, microspheres) may also serve as passivation agents in the dispersion. Suitable insulating agents that also provide passivation include sodium silicate. By passivation, it is meant that a component provides corrosion resistance to an underlying substrate such as by forming a nonreactive or passive portion thereon. Where insulating agents are used that do not function as passivating agents, auxiliary passivating agents such as magnesium oxide, zinc phosphate, metal-modified zinc phosphates, metal-modified phosphosilicate and/or metal-modified borosilicate, wherein the metal comprises calcium, barium, strontium, molybdenum, magnesium and/or aluminum, may be included in the dispersion.

Organic Carrier

The dispersion of the present invention includes an organic carrier that optimally does not dissolve the RTV silicone polymer (a) or alkoxy polysiloxane (b), but instead allows for a suspension thereof in the form of a dispersion. As used herein, the term "dispersion" refers to a two-phase system in which one dispersed phase (the polymers (a) and (b)) is distributed in a second, continuous phase (the organic carrier). Suitable organic carriers include but are not limited to solvents such as ketones, aliphatic and aromatic hydrocarbons, esters, ethers, halogenated hydrocarbons and the like. For example, these solvents may be selected from methyl ethyl ketone, methyl amyl ketone, xylene, toluene, mineral spirits, methyl acetate, cyclohexane, dimethyl carbonate, parachlorobenzotrifluoride, and combinations thereof. The organic carrier may comprise a single solvent or a blend of solvents, for example selected from those recited above. When used in combination of two solvents, the ratio of solvents can vary from 1:1 to 10:1. The particular solvents and/or ratios thereof may be selected to achieve suspension of the RTV silicone polymer (a) and alkoxy polysiloxane (b) therein.

The dispersion of the present invention may be produced by combining the RTV silicone polymer (a), polysiloxane (b) with insulating agent (c) to form a dispersion, in carrier (d), optionally containing the auxiliary passivating agent and/or any other optional component such as those noted below. Upon spraying the dispersion onto a substrate in the presence of moisture, and a catalyst, the RTV silicone polymer (a) and alkoxy polysiloxane polymer (b) cure, such as by moisture curing, and may further react together and/or interpenetrate the resulting respective polymer chains. Suitable catalysts for moisture curing the polymers in the dispersion of the present invention, if needed, include alkyl titanates (such as tetra-n-butyl-titanate) and organotin compounds (such as dibutyl tin dilaurate).

The dispersion of the present invention is curable at ambient conditions, e.g. at room temperature (20-25° C.) or in the range of 5 to 38° C. The ambient curable coating composition may include (a) an RTV silicone polymer, (b) a polysiloxane and (c) an insulating agent, as well as an organic carrier (d). The RTV siloxane polymer (a) may be present in the dispersion of the present invention in an amount of 6 weight (wt.) % or greater, such as 8 wt. % or greater, or 10 wt. % or greater and/or may be present in the dispersion of the present invention at 29 wt. % or lower, or 25 wt. % or lower, or 21 wt. % or lower based on the total weight of the dispersion. The RTV silicone polymer may be present in the dispersion in wt. % range from 6-29, such as 8-25 or 10-21 or another range combination using those endpoints, with wt. % based on the total weight of the dispersion. The polysiloxane (b) may be present in the dispersion of the present invention in an amount of 1 wt. % or greater, such as 2 wt. % or greater, or 3 wt. % or greater and/or may be present at 10 wt. % or lower, or 8 wt. % or lower, or 6 wt. % or lower based on the total weight of the dispersion. The polysiloxane may be present in the dispersion in wt. % range from 10-1, such as 8-2 or 6-3 or another range in combination using those endpoint, with wt. % based on the total weight of the dispersion. The insulating agent (c) may be present in the dispersion of the present invention in an amount of 15 wt. % or greater, such as 19 wt. % or greater, or 23 wt. % or greater, and/or may be present at 40 wt. % or lower, or 35 wt. % or lower, or 31 wt. % or lower based on the total weight of the dispersion. The insulating agent may be present in the dispersion of the present invention in wt. % range from 15-40, such as 19-35, or 23-31 or another range in combination using those endpoints, with wt. % based on the total weight of the dispersion. The organic carrier (d) may be present in the dispersion of the present invention in an amount of 32 wt. % or greater, such as 37 wt. %, or 42 wt. % or greater, and/or can be present in the dispersion of the present invention in an amount of 57 wt. % or lower or 52 wt. % or lower or 47 wt. % or lower based on the total weight of the dispersion. The organic carrier may be present in the dispersion in wt. % range from 32-57, such as 37-52 or 42-47 or another range in combination using those endpoints, with wt. % based on the total weight of the dispersion. Other components that may be included in the dispersion of the present invention include a metal catalyst (present in an amount of at least 0.1 wt. % or at most 0.5 wt. % or 0.1 to 0.5 wt. %), a rheology modifier (present in an amount of at least 1 wt. % or at most 5 wt. % or in a range of 1 to 5 wt. %) and/or an auxiliary passivating agent (present in an amount of at least 1 wt. % or at most 10 wt. % or in a range of 1 to 10 wt. %), with wt. % based on the total weight of the dispersion.

A person skilled in the art working the present invention will know that the selection of the particular compounds for each of (a) a room temperature vulcanizing (RTV) silicone polymer, (b) an alkoxy polysiloxane, (c) an insulating agent, and (d) an organic carrier in which components (a), (b), and (c) are suspended will depend on the particular application of the coating composition. For example, if the coating composition was intended to be used on a metal substrate then the skilled person may select particular components of (a), (b), (c) and (d) to achieve a desired insulating effect, coating build thickness, adhesion to the substrate and/or heat resistance, depending on the environments of end use, such as metal pipe.

The dispersion of the present invention may comprise one or more other components, including but not limited to, moisture scavengers (up to 5 wt. %), pigments, aggregates, rheological modifiers, plasticizers, antifoam agents, adhesion promoters, suspending agents, thixotropic agents, fillers (e.g. mineral wool, Wollastonite, stone wool insulation, such as ROCKWOOL (Rockwool International of Milton, ON), graphite, alumina, potassium titanate), catalyst chelators (in a weight ratio relative to the metal catalyst of 1:10), pigment wetting agents, bituminous and asphaltic extenders, antisettling agents, diluents, UV light stabilizers, air release agents, dispersing aids, surfactants, or mixtures of any thereof. One of ordinary skill in the coating compositions art would understand that other common components may be incorporated into the dispersion. The dispersion may comprise up to 10 wt. % of such components based on the total weight of the dispersion.

The dispersion of the present invention may be spray applied to a substrate such as a metal substrate directly (i.e. "direct to metal" or DTM) with no pretreatment of the substrate or any intervening primer layer. In a single spraying process, a coating of at least 100 mils or at least 500 mils or at least 1000 mils thick may be formed on the substrate as a single monolithic coating. By "monolithic coating" it is meant that a single layer of the dispersion is applied which cures to form a coating on the substrate without subsequent application of the dispersion needed to build coating thickness. No additional applications are needed to build a coating thickness of at least 100 mils/up to 1000 mils, such as up to 500 mils. In contrast, conventional coating systems typically require reapplication of layers of coating compositions at spaced apart time intervals to allow for curing of each applied layer in order to build coating thickness to a desired level that is effective for insulation and corrosion protection of the substrate. It is believed that corrosion protection of a substrate can be achieved via a coating layer prepared from the dispersion of the present invention which includes an RTV silicone polymer (a large, elastomeric polymer) and an alkoxy polysiloxane, which can be applied directly to a metal substrate when suspended in an organic carrier thereby forming a hybrid silicone layer.

The substrate onto which the coating composition of the present invention may be applied may be made of any suitable material, particularly from materials (such as metals) that may be subject to degradation such as blistering, cracking, failed adhesion and/or corrosion in certain environments. A metal substrate suitable for use with the present invention may include ferrous and non-ferrous materials such as tin, aluminum, steel, such as, stainless steel, tin-plated steel, chromium passivated steel, galvanized steel, or coiled steel, or other coiled metal, zinc, aluminum, nickel, copper, magnesium and alloys thereof, silver and gold and the like and any metallic alloys thereof. Such substrates may be at least a portion of a component of industrial, chemical, and/or process equipment. Nonlimiting examples thereof include reactors, exhaust stacks, reformers, distillation columns, piping, valves, heat exchangers, boilers and/or vessels (including storage tanks for materials such as industrial liquids, hydrocarbon fuels and liquid natural gas). Such equipment may be utilized in various industries, such as food processing, pulp and paper production, and agricultural-related power generation.

Other surfaces suitable for the compositions provided herein may comprise any desirable substantially solid material that vary widely. For example, the type of surfaces that can be treated with the compositions of this disclosure includes glass; fiberglass; carbon fiber composites; basalt fiber composites; siloxane and ceramic fibers; ceramics, such as, silicon nitride, silicon carbide, silica, alumina, zirconia, and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include metal, glass, ceramic, plastics, wood or composite material. Other layers of material comprising the surface or substrate may include layers of polymers, monomers, organic compounds, inorganic compounds, organometallic compounds, continuous layers, porous and nanoporous layers.

The present invention is also directed to the following clauses, without being limited thereto.

A first clause is directed to a sprayable polymer dispersion comprising (a) a room temperature vulcanizing (RTV) silicone polymer, (b) a polysiloxane which may be an alkoxy polysiloxane, (c) an insulating agent and (d) an organic carrier in which components (a), (b), and (c) are suspended. A second clause is directed to the dispersion of clause one, wherein the organic carrier (c) comprises a blend of solvents, wherein the solvents are methyl ethyl ketone, methyl amyl ketone, xylene, toluene, mineral spirits, methyl acetate, cyclohexane, dimethyl carbonate, and/or parachlorobenzotrifluoride. A third clause is directed to the dispersion of any of clauses one or two, wherein the insulating agent comprises microspheres. A fourth clause is directed to the dispersion of any of clauses one to three, wherein the microspheres comprise a passivation agent. A fifth clause is directed to the dispersion of any of clauses one to four, further comprising addition of components (a) to (d), a passivation agent selected from the following: magnesium oxide, zinc phosphate, metal-modified zinc phosphate, metal-modified phosphosilicate and/or metal-modified borosilicate, wherein the metal comprises calcium, barium, strontium, molybdenum, magnesium and/or aluminum. A sixth clause is directed to the dispersion of any of clauses one to five, wherein the polysiloxane is substantially free of phenyl groups. A seventh clause is directed to the dispersion of any of clauses one to six, wherein the alkoxy polysiloxane is completely free of phenyl groups. An eighth clause is directed to a method of producing a coating on a substrate comprising spraying the dispersion of any of clauses one to seven onto at least a portion of a substrate and curing of each components (a) and (b) to form a monolithic coating on the substrate. A ninth clause is directed to the method of clause eight, wherein the monolithic coating is produced by spraying the dispersion in one pass over the substrate to produce a coating that is at least 100 mils thick. A tenth clause is directed to the method of any of clauses eight to ten, wherein the monolithic coating is produced by spraying the dispersion in one pass over the substrate to produce a coating that is at least 500 mils thick. An eleventh clause is directed to the method of clause nine, wherein the dispersion is sprayed directed onto the substrate with no coating or treatment layer in between the substrate and the dispersion. A twelfth clause is directed to the method of any of clauses eight to eleven, wherein the RTV polymer comprises a single component. A thirteenth clause is directed to the method of any of clauses eight to twelve, wherein the RTV polymer is produced from a two-part reaction mixture comprising a binder component and a crosslinking component. A fourteenth clause is directed to a coating formed from the polymer dispersion of any of clauses one to seven. A fifteenth clause is directed to the coating of clause fourteen wherein the coating is at least partially cured. A sixteenth clause is directed to a substrate at least partially coated with the dispersion of any of clauses one to seven. A seventeenth clause is directed to the substrate of clause sixteen, wherein the dispersion is moisture cured as a monolithic coating. An eighteenth clause is directed to the substrate of clause sixteen or seventeen, wherein the substrate is metal. A nineteenth clause is directed to an industrial processing component comprising the substrate of any of clauses sixteen to eighteen. A twentieth clause is directed to the industrial processing component of clause nineteen wherein the component comprises a reactor, exhaust stack, reformer, distillation column, piping, valve, heat exchanger, boiler or storage tank.

Whereas particular embodiments of this invention have been described above for purposes of illustration, it will be evident to those skilled in the art that numerous variations of the details of the present invention may be made without departing from the invention as defined in the appended claims.

The following examples are presented to demonstrate the general principles of the invention. The invention should not be considered as limited to the specific examples presented. All parts and percentages in the examples are by weight unless otherwise indicated.

EXAMPLES

Sprayable dispersions were prepared using the components of Tables 1-10 by adding the components sequentially as listed to a clean dry container under medium mixing using a cowles blade. Once all items were added to the container, they were mixed for 30-60 minutes or until completely homogenized. In Example 4, the components were added sequentially to a clean dry container under medium mixing using a cowles blade. Once all items were added to the container, they were mixed for 30-60 minutes or until completely homogenized. Item 10 was kept separate and added before application with medium mixing.

Comparative Example 1

A comparative dispersion was prepared using the components of Table 1.

TABLE 1

| Material | Weight (g) |
| --- | --- |
| methyl ethyl ketone | 50.49 |
| mineral spirits | 5.39 |
| GENIOSIL XL-10[1] | 1.96 |
| ELASTOSIL E951[2] | 15.69 |
| ROCK FORCE MS603[3] | 4.51 |
| SPHERICEL 34P30[4] | 13.33 |
| ground cork[5] (filler) | 8.63 |

[1] Vinyl alkoxy silane available from Wacker Chemical Corporation (Adrian, MI)
[2] RTV silicone polymer available from Wacker Chemical Corporation (Adrian, MI)
[3] Mineral fiber available from Lapinus Fibres BV (Roermond, NL)
[4] AHollow glass microspheres available from The Cary Company (Addison, IL)
[5] Ground cork available from Jelinek Cork Group (Savannah, GA)

Comparative Example 2

A comparative dispersion was prepared using the components of Table 2.

TABLE 2

| Material | Weight (g) |
| --- | --- |
| ELASTOSIL E951 | 10.73 |
| methyl ethyl ketone | 36.06 |
| DOWSIL 2405[6] | 3.58 |
| TYZOR TnBT[7] | .12 |
| ROCK FORCE MS603 | 2.75 |
| mineral spirits | 3.79 |
| GENIOSIL XL-10 | 2.75 |
| calcium carbonate[8] (filler) | 39.89 |

[6] Silicone intermediate, available from Dow Corning Corporation (Midland, MI)
[7] Titanate catalyst, available from Dorf Ketal Specialty Catalysts (Houston, TX)
[8] Calcium carbonate, available from Sigma-Aldrich (St. Louis, MO)

Comparative Example 3

A dispersion with an RTV polymer and insulating agent was prepared using the components of Table 3.

TABLE 3

| Material | Weight (g) |
| --- | --- |
| mineral spirits | 4.13 |
| GENIOSIL XL-10 | 1.97 |
| methyl ethyl ketone | 39.13 |
| TYZOR TnBT | 0.17 |
| ELASTOSIL E951 | 20.56 |
| BENTONE SD-2[9] | 4.12 |

TABLE 3-continued

| Material | Weight (g) |
| --- | --- |
| ROCK FORCE MS603 | 3.95 |
| Q-CEL 7040S[10] | 25.48 |

[9]Clay rheology modifier, available from Elementis Specialties (East Windsor NJ)
[10]Hollow sodium silicate microspheres available from The Cary Company (Addison, IL)

Example 4

A dispersion with a 2K RTV polymer and alkoxy polysiloxane with insulating agent was prepared using the components of Table 4.

TABLE 4

| Material | Weight (g) |
| --- | --- |
| methyl ethyl ketone | 38.67 |
| mineral spirits | 4.08 |
| DOWSIL 2405 | 5.08 |
| GENIOSIL XL-10 | 1.95 |
| TYZOR TnBT | 0.16 |
| BENTONE SD-2 | 4.07 |
| ROCK FORCE MS603 | 3.9 |
| ELASTOSIL M4444 US[11] | 14.92 |
| Q-CEL 7040S | 25.18 |
| Catalyst T77[12] | 1.49 |

[11]RTV silicone polymer available from Wacker Chemical Corporation (Adrian, MI)
[12]Titanate catalyst, available from Dorf Ketal Specialty Catalysts (Houston, TX)

Example 5

A dispersion was prepared using the components of Table 5.

TABLE 5

| Material | Weight (g) |
| --- | --- |
| methyl amyl ketone | 43.75 |
| GENIOSIL XL-10 | 1.97 |
| DOWSIL 2405 | 5.14 |
| TYZOR TnBT | 0.17 |
| BENTONE SD-2 | 4.12 |
| ROCK FORCE MS603 | 3.95 |
| ELASTOSIL E951 | 15.42 |
| Q-CEL 7040S | 25.48 |

Example 6

A dispersion was prepared using the components of Table 6.

TABLE 6

| Material | Weight (g) |
| --- | --- |
| toluene | 43.75 |
| GENIOSIL XL-10 | 1.97 |
| DOWSIL 2405 | 5.14 |
| TYZOR TnBT | 0.17 |
| BENTONE SD-2 | 4.12 |
| ROCKFORCE MS603 | 3.95 |
| ELASTOSIL E951 | 15.42 |
| Q-CEL 7040S | 25.48 |

Example 7

A dispersion was prepared using the components of Table 7.

TABLE 7

| Material | Weight (g) |
| --- | --- |
| methyl ethyl ketone | 38.62 |
| mineral spirits | 4.02 |
| GENIOSIL XL-10 | 1.92 |
| DOWSIL 2405 | 5.02 |
| TYZOR TnBT | 0.16 |
| BENTONE SD-2 | 1.86 |
| ROCK FORCE MS603 | 3.85 |
| HALOX SZP-391[13] | 7.17 |
| ELASTOSIL E951 | 15.03 |
| SPHERICEL 34P30[14] | 22.34 |

[13]Zinc phosphate corrosion inhibitor available from ICL Specialty Products Inc. (Hammond, IN)
[14]Hollow borosilicate microspheres available from The Cary Company (Addison, IL)

Example 8

A dispersion was prepared using the components of Table 8.

TABLE 8

| Material | Weight (g) |
| --- | --- |
| methyl ethyl ketone | 42.43 |
| mineral spirits | 4.42 |
| GENIOSIL XL-10 | 2.12 |
| DOWSIL 2405 | 5.51 |
| TYZOR TnBT | 0.18 |
| BENTONE SD-2 | 2.05 |
| ROCK FORCE MS603 | 4.23 |
| ELASTOSIL E951 | 16.52 |
| EXTENDOSPHERES KLS-150[15] | 22.51 |

[15]Aluminum silicate microspheres available from Kish Company Inc. (Mentor, OH)

Example 9

A dispersion was prepared using the components of Table 9.

TABLE 9

| Material | Weight (g) |
| --- | --- |
| methyl ethyl ketone | 39.74 |
| mineral spirits | 4.14 |
| GENIOSIL XL-10 | 1.98 |
| DOWSIL 2405 | 5.16 |
| TYZOR TnBT | 0.17 |
| BENTONE SD-2 | 1.92 |
| ROCK FORCE MS603 | 3.96 |
| HALOX SZP-391 | 7.37 |
| ELASTOSIL E951 | 15.46 |
| EXTENDOSPHERES KLS-150 | 20.11 |

Example 10

A dispersion was prepared using the components of Table 10.

TABLE 10

| Material | Weight (g) |
|---|---|
| methyl ethyl ketone | 39.62 |
| mineral spirits | 4.13 |
| DOWSIL 2405 | 5.14 |
| GENIOSIL XL-10 | 1.97 |
| TYZOR TnBT | 0.17 |
| BENTONE SD-2 | 4.12 |
| ROCK FORCE MS603 | 3.95 |
| ELASTOSIL E951 | 15.42 |
| Q-CEL 7040S | 25.48 |

Test Methods

High Film Build Determination

Samples were applied to 3.175 mm thick steel panels (blasted, 1-2 mil profile, degreased) at a dry film thickness of 2.5 mm (100 mils) via drawdown. After allowing to dry for 24 hours, the films were assessed for any signs of cracking or other visible signs of coating degradation as reported in Table 11. After coating, the panels were exposed to 260° ° C. using a hot plate. The panels were placed on a room temperature hot plate, then brought to temperature over a period of 30 minutes. Once at the target temperature, the panels were exposed continuously for 100 hours, after which they were allowed to cool naturally to ambient temperature and checked for cracking and blistering.

Corrosion Testing

Samples were applied to 100 mm×150 mm×3.175 mm thick steel panels (blasted, 1-2 mil profile, degreased) at a dry film thickness (DFT) of 2.5 mm via drawdown. Where formulations (Comparative Example 2, Example 5, and Example 6) did not allow for single coats of 2.5 mm DFT, multiple coats were applied to reach the target DFT, with 16-24 hours in between successive coats. One set of panels was allowed to dry at ambient conditions for 7 days, after which they were exposed to 260° C. temperatures on a hot plate for 100 hours. Observations were made of cracking, delamination, or blistering on heating. Another set of panels was allowed to dry at ambient conditions until test, at least 2 weeks.

The coatings were artificially damaged with a 10 mm long scribe to underlying substrate, and subsequently exposed to a corrosive environment for 1500 hours in accordance with ASTM B117. At the completion of the exposure period, the panels were allowed to dry at ambient conditions for 24 hours, then tested for adhesion strength according to ASTM D4541. Following this, the panels were stripped of coating and corrosion at scribe was measured in accordance with ASTM D1654 as reported in Table 12.

TABLE 11

High Build and Heat Stability Results

| Example | Cracking at 100 mils DFT | Blistering After Heating |
|---|---|---|
| CE 1 | No | No |
| CE 2 | Yes | No |
| CE 3 | No | Yes |
| Ex. 4 | No | No |
| Ex. 5 | Yes | No |
| Ex. 6 | Yes | No |
| Ex. 7 | No | No |
| Ex. 8 | No | No |
| Ex. 9 | No | No |
| Ex. 10 | No | No |

TABLE 12

Average Scribe Creep readings, 1500 Hours B117

| Example | Ambient Only | 500 F. Exposure |
|---|---|---|
| CE 1 | 21.9 | 9.6 |
| CE 2 | 30.9 | 15.4 |
| CE 3 | 6.2 | 4.3 |
| Ex. 4 | 3.1 | 3.9 |
| Ex. 5 | 4.5 | 2.1 |
| Ex. 6 | 5.5 | 8.1 |
| Ex. 7 | 1.4 | 2.5 |
| Ex. 8 | 11.1 | 2 |
| Ex. 9 | 4.1 | 1.1 |
| Ex. 10 | 4.1 | 2.8 |

It is to be appreciated that a combination of acceptable properties (film build and corrosion resistance) were found for the dispersions of Examples 4-10. Comparative Examples 1 and 2 lacked an insulating agent and exhibited poor corrosion resistance. Comparative Example 3 (no polysiloxane) failed heat stability testing. Example 8 exhibited slightly less resistance to corrosion (compared to Examples 4-7, 9, and 10) likely due to the lack of a corrosion inhibitor.

The dispersion of the present invention showed improved insulation properties in a single coating 500 mils thick as compared to other corrosion resistant coatings as summarized in Table 13

TABLE 13

| Coating material | Coating thickness (mils) | No. of coating passes to achieve thickness |
|---|---|---|
| Example 10 | 500 | 1 |
| Epoxy binder[16] | 30 | 5 |
| Acrylic aerogel[17] | 20 | 75 |
| Acrylic[18] | 20 | 75 |

[16]CARBOLINE 551, available from Carboline Company (Euclid, OH)
[17]TENEMEC 971, available from Tenemel Inc. (Kansas City, MO)
[18]INDUSTRIAL-DTI, available from Mascoat Ltd. (Houston, TX)

The invention claimed is:

1. A sprayable polymer composition comprising:
   (a) a room temperature vulcanizing (RTV) silicone polymer formulated such that during curing, terminal groups of the RTV silicone polymer include acetoxy, alkoxy, and/or amine groups;
   (b) a polysiloxane different from the RTV silicone polymer;
   (c) an insulating agent; and
   (d) an organic carrier in which components (a), (b), and (c) are suspended.

2. The composition of claim 1, wherein the organic carrier (d) comprises a ketone, aliphatic hydrocarbon, aromatic hydrocarbon, ester, ether, halogenated hydrocarbon, or combination thereof.

3. The composition of claim 1, wherein the insulating agent comprises microspheres.

4. The composition of claim 3, wherein the microspheres comprise a passivation agent.

5. The composition of claim 1, further comprising, in addition to components (a)-(d), a passivation agent selected from the following: magnesium oxide, zinc phosphate, metal-modified zinc phosphates, metal-modified phosphosilicate and/or metal-modified borosilicate, wherein the metal comprises calcium, barium, strontium, molybdenum, magnesium and/or aluminum.

6. The composition of claim 1, wherein the polysiloxane is substantially free or completely free of phenyl groups.

7. The composition of claim 1, wherein the polysiloxane is an alkoxy polysiloxane.

8. A method of producing a coating on a substrate comprising spraying the composition of claim 1 onto at least a portion of a substrate and curing of each components (a) and (b) to form a monolithic coating on the substrate.

9. The method of claim 8, wherein the monolithic coating is produced by spraying the composition in one pass over the substrate to produce a coating that is at least 100 mils thick.

10. The method of claim 8, wherein the monolithic coating is produced by spraying the composition in one pass over the substrate to produce a coating that is at least 500 mils thick.

11. The method of claim 9, wherein the composition is sprayed directly onto the substrate with no coating or treatment layer in between the substrate and the composition.

12. The method of claim 9, wherein the RTV polymer comprises a single component.

13. The method of claim 9, wherein the RTV polymer is produced from a two-part reaction mixture comprising a binder component and a crosslinking component.

14. A coating formed from the polymer composition of claim 1.

15. The coating of claim 14, wherein the coating is at least partially cured.

16. A substrate at least partially coated with the composition of claim 1 or a coating formed therefrom.

17. The substrate of claim 16, wherein the composition is moisture cured as a monolithic coating.

18. The substrate of claim 16, wherein the substrate is metal.

19. An industrial processing component comprising the substrate of claim 16.

20. The industrial processing component of claim 19, wherein the component comprises a reactor, exhaust stack, reformer, distillation column, piping, valve, heat exchanger, boiler or storage tank.

* * * * *

UNITED STATES PATENT AND TRADEMARK OFFICE
CERTIFICATE OF CORRECTION

| | | |
|---|---|---|
| PATENT NO. | : 12,084,593 B2 | Page 1 of 1 |
| APPLICATION NO. | : 17/416826 | |
| DATED | : September 10, 2024 | |
| INVENTOR(S) | : Betzig et al. | |

It is certified that error appears in the above-identified patent and that said Letters Patent is hereby corrected as shown below:

On the Title Page

Page 2, right column, item (56) Line 4, "IN" should read -- CN --.

Signed and Sealed this
Eighth Day of April, 2025

Coke Morgan Stewart
*Acting Director of the United States Patent and Trademark Office*